(12) United States Patent
Hayes

(10) Patent No.: US 6,929,740 B2
(45) Date of Patent: Aug. 16, 2005

(54) WATER PURIFICATION SYSTEM

(75) Inventor: John Hayes, High Wycombe (GB)

(73) Assignee: T.P. Technology plc, High Wycombe (GB)

( * ) Notice: Subject to any disclaimer, the term of this patent is extended or adjusted under 35 U.S.C. 154(b) by 112 days.

(21) Appl. No.: 10/342,708

(22) Filed: Jan. 14, 2003

(65) Prior Publication Data

US 2003/0132172 A1 Jul. 17, 2003

(30) Foreign Application Priority Data

Jan. 14, 2002 (GB) .............................. 0200736

(51) Int. Cl.$^7$ ................................. C02F 1/46
(52) U.S. Cl. ................. 210/138; 204/229.4; 204/229.6; 204/230.2; 204/272; 204/663; 204/670
(58) Field of Search ................. 210/138; 204/229.4, 204/229.6, 230.2, 272, 660, 663, 670

(56) References Cited

U.S. PATENT DOCUMENTS

| 4,036,716 A | 7/1977 | Hulthe ....................... 204/147 |
| 4,655,895 A | 4/1987 | Feofanov et al. ........... 204/213 |
| 4,680,114 A | 7/1987 | Hayes ........................ 210/192 |
| 5,085,753 A | 2/1992 | Sherman ..................... 204/267 |
| 5,094,739 A | 3/1992 | Kump ......................... 204/150 |
| 5,603,843 A | 2/1997 | Snee .......................... 210/748 |
| 5,633,423 A | 5/1997 | Federici et al. ............. 588/204 |
| 6,113,779 A * | 9/2000 | Snee .......................... 210/138 |
| 6,287,450 B1 | 9/2001 | Hradil ........................ 205/745 |

FOREIGN PATENT DOCUMENTS

| DE | 296 13 661 U1 | 8/1996 | ........... C02F/1/462 |
| DE | 198 01 735 A1 | 1/1998 | ........... C02F/11/00 |
| WO | WO 99/08482 | 2/1999 | ........... H05B/3/60 |
| WO | WO 99/38807 | 8/1999 | ............ C02F/1/46 |
| WO | WO 00/00434 | 1/2000 | ............ C02F/1/48 |

* cited by examiner

Primary Examiner—Betsey Morrison Hoey
(74) Attorney, Agent, or Firm—Renner, Kenner, Greive, Bobak, Taylor & Weber

(57) ABSTRACT

A water purification apparatus used to prevent the formation of scale around electrodes which form part of the apparatus. The apparatus comprises at least one electrode containing a proportion of an ion-emitting electrode such as copper, silver or a copper and silver alloy and at least one electrode containing a proportion of a non-emissive metal such as titanium. The electrodes are connected to a DC power supply which has switching means to reverse the polarity of the electrodes at predetermined intervals. The apparatus ensures accurate control of disinfection and minimal equipment maintenance.

6 Claims, 3 Drawing Sheets

WATER PURIFICATION SYSTEM

The present invention relates to a water purification apparatus. More particularly, this invention relates to the apparatus used to prevent the formation of scale around electrodes which form part of the apparatus.

Typically, water purification apparatus comprises electrode cells which contain either separate copper and silver electrodes or copper/silver alloy electrodes of a number of ratios depending on application. Two or more electrodes are employed and the applied voltage reversed at set time intervals so that, in turn, each pair of electrodes are alternately an anode or a cathode so that current flows in opposite directions therefore depleting each electrode in turn. The effect of passing current in this manner attracts dissolved minerals and salts onto the surface of the electrodes, thus forming an insulting barrier which is referred to a scale and requires regular removal by using diluted acid or other scale removing proprietary treatments. Regular cleaning is disruptive and involves the use of chemicals.

The present invention provides a water purification apparatus comprising:
at least two electrodes connected to a DC power supply;
a first electrode being a cathode; and
a second electrode being an anode; wherein
at least one electrode contains a proportion of an ion-emitting metal such as copper; and wherein
at least one electrode contains a proportion of non-emissive metal such as titanium.

Additionally, the polarity of a voltage applied by the DC power supply to the electrodes may be reversed at periodic intervals for predetermined periods of time.

The voltage applied by the DC power supply is advantageously in the range of 0–110V but it will be appreciated that this range is not a limitation and may be varied in accordance with any changes to the water properties such as conductivity.

Features and advantages of the present invention will become apparent from the following description of embodiment thereof given by way of example with reference to the accompanying drawings, in which.

Figure 1:
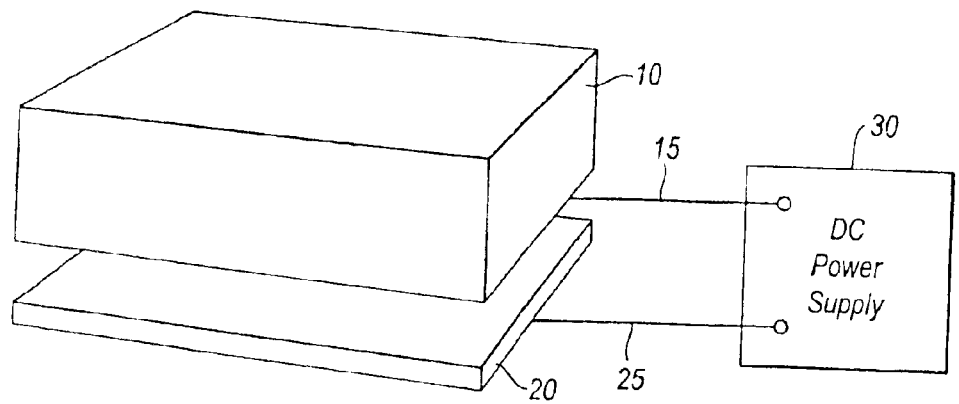
FIG. 1 is a schematic view of one embodiment of the present invention.

FIG. 1 shows one arrangement of a water purification apparatus arranged to form an electrode cell and avoid the build up of scale on each of the electrodes 10,20 when a current is applied and they are exposed to a liquid eg water for disinfection purposes. The arrangement comprises an ion-emitting electrode 10 formed of a metal such as copper connected to a DC power supply 30 with cable 15. Alternatively, the electrode 10 may be formed of silver or a copper and silver alloy hence it should be noticed that electrode 10 is not restricted to copper alone. The arrangement further comprises an electrode 20 formed of titanium grade 1 or 2 coated with iridium oxide, ruthenum oxide or titanium oxide connected to a DC power supply 30 via cable 25.

The electrodes 10, 20 are connected to the power supply 30 in a way so that, initially, the electrode 10 forms the cathode and the electrode 20 forms the anode of this arrangement.

Figure 5:
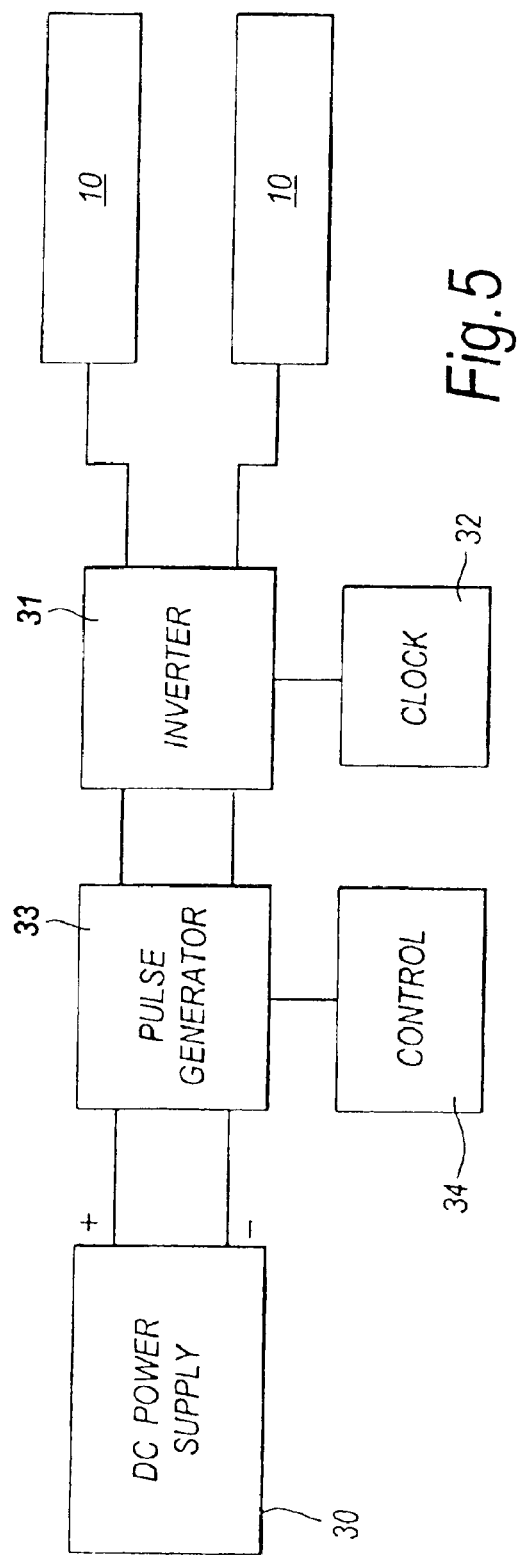
FIG. 5 shows a block diagram of a control system which forms part of the present invention.

As shown in FIG. 5, the apparatus also comprises switching means for reversing the polarity of the output from the power supply at any time so electrode 10 becomes the anode and electrode 20 becomes the cathode. The switching means can be either manually or automatically controlled.

Figure 6:
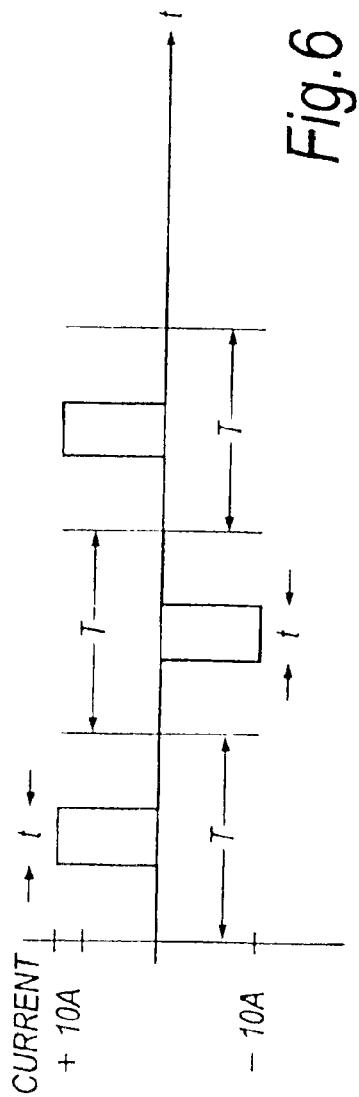
FIG. 6 shows a waveform diagram of the output of the control system shown in FIG. 5.

In a preferred embodiment, the polarity of the output is switched for a predetermined interval in every predetermined cyclic period, for example, the polarity is switched between 30 and 60 seconds (typically 45 seconds) under control of a clock 32. However, it is also possible to further vary the switching times to achieve the desired effect. In an alternative embodiment, quiescent periods may exist between switching the polarity of the output and these are created by a pulse generator cfircuit 33. Further, the time spent in which the output is switched does not have to be the same in each predetermined cyclic period, as it is possible to vary this time using a control circuit 34 and to still achieve the desired effect. This is shown in FIG. 6 where it will be seen that the pulse generator 33 and control circuit 34 allow the pulse width t to be varied each cycle T. The switching and voltage control ensures accurate control of disinfection and minimal equipment maintenance.

It will be appreciated that a plurality of electrode cells may be used in the water purification apparatus and each cell need not comprise the same electrode arrangement. For example, one electrode cell may comprise a pure copper electrode and a titanium electrode and another electrode cell, which forms part of the same water purification apparatus, may comprise a pure silver electrode and a titanium electrode. It should also be appreciated that a plurality of ion-emitting electrodes 10 may be utilised in each electrode cell while still producing the desired effect of reducing scale formation on the electrodes.

In particular, two ion-emitting electrodes 10 would be suitable where the conductivity of the water is low or where it is not practical to fit one large ion-emitting electrode.

In another embodiment where two ion-emitting electrodes are utilised, one electrode is composed of a copper and silver alloy and the other is composed of pure silver. This arrangement is advantageous where silver becomes complexed with high levels of chlorides in the water.

Figure 2:
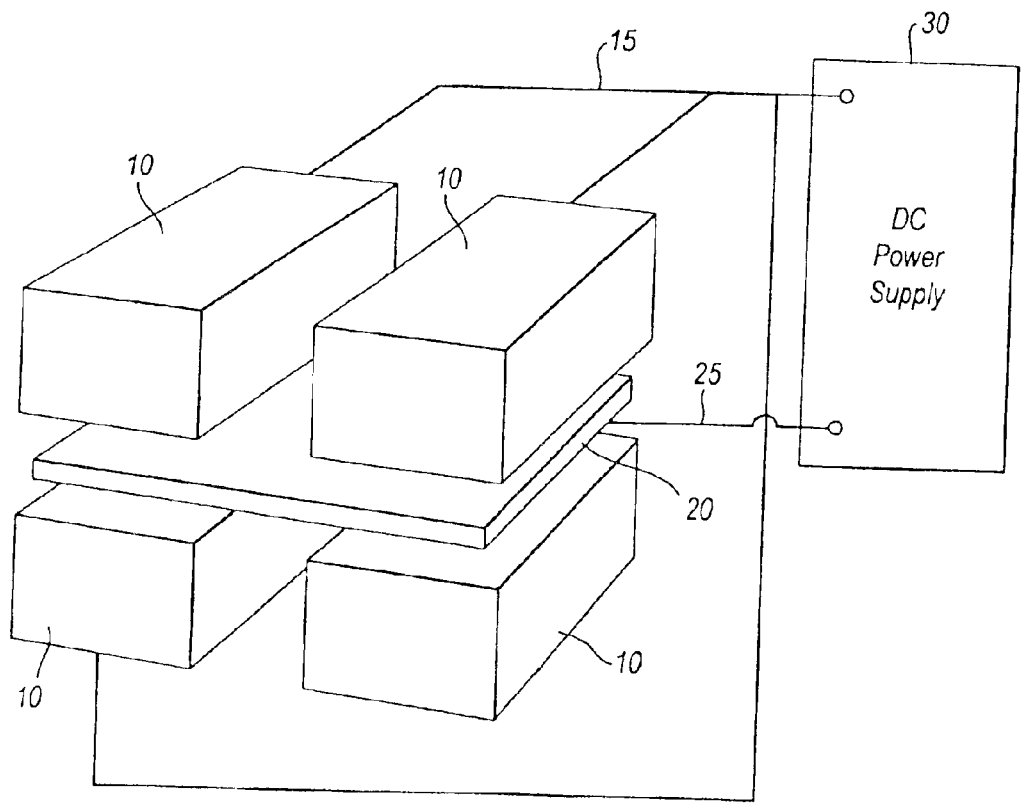
FIG. 2 is a schematic view of a further embodiment of the present invention.

FIG. 2 shows an alternative arrangement of the water purification apparatus which may be used to form a larger electrode cell than the previous embodiment. The arrangement comprises an electrode 20 preferably formed of titanium and four electrodes 10 preferably formed of copper. Two of the electrodes 10 are located on one side of the electrode 20 and the other two electrodes 10 are on the opposite side of the electrode 20. The four electrodes 10 are connected together via cable 15 to a DC power supply 30. The electrode 20 is connected to the power supply 30 via cable 25. It is also possible for the number of electrodes 10 to be reduced to only two electrodes, one on either side of the electrode 20.

The number of electrodes specified in the above embodiment can be varied to produce the desired effect of avoiding scale to be formed on any of the electrodes and numbers given above are by way of example only.

Figure 3:
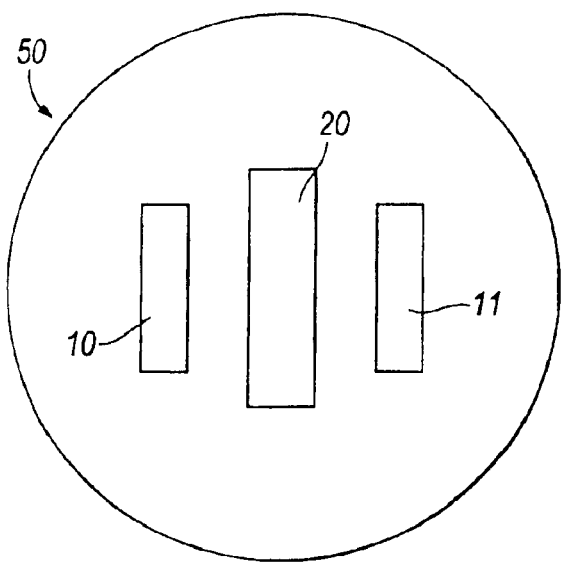
FIG. 3 shows an alternative arrangement which may be provided by the present invention.

FIG. 3 shows one of many alternative arrangements which may be provided by the present invention. This arrangement utilises two ion-emitting electrodes 10,11 and a non-emissive electrode 20. The two electrodes 10,11 are located on either side of the electrode 20 and this arrangement forms an electrode cell 50. this arrangement differs from that of FIG. 1 in that electrode 10 does not have to be composed of the same material as electrode 11. It is possible for any combination of ion-emitting electrodes 10,11 to be utilised and this combination will still produce the desired effect. The non-emissive electrode 20 forming part of the arrangement is preferably, but not exclusively, titanium and it will be appreciated that any appropriate non-emissive material may be used in the composition of the electrode 20. In this particular embodiment, electrode 10 is formed of copper and electrode 11 is formed of silver. The electrode 20 located between the electrode 10 and electrode 11 is formed of titanium.

The apparatus further comprises signal splitting means to split the voltage output from the DC power supply provided to the copper 10 and silver 11 electrodes by either varying the voltage between a predetermined range such as 0–100V or maintaining a predetermined voltage and providing the switching means with a control to vary an on/off ratio which in turn determines the level of ions released by the electrodes 10,11. This is advantageous in allowing the copper/silver ratio to be altered to obtain the correct balance of ions being emitted by the electrodes.

Figure 4:
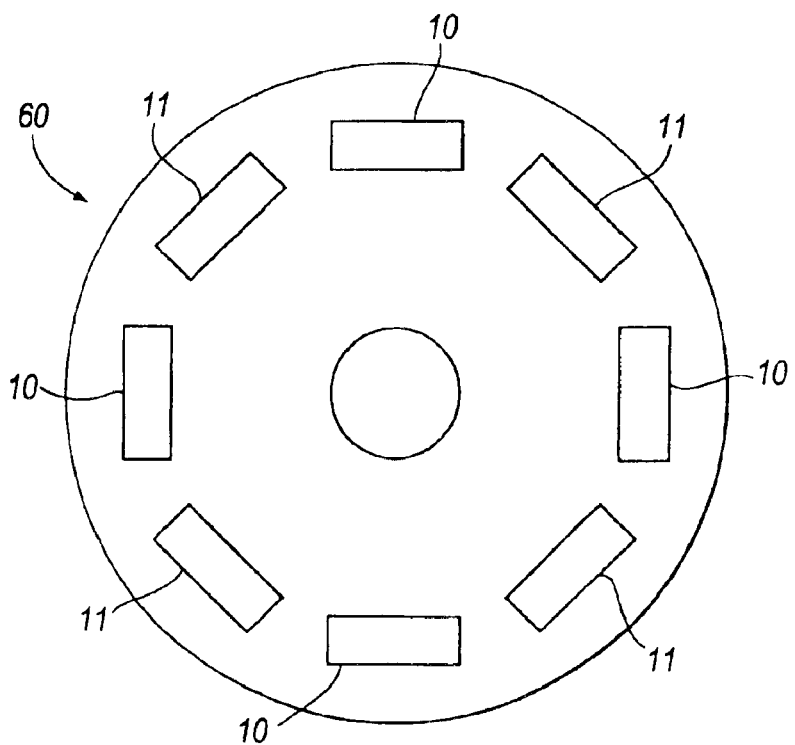
FIG. 4 shows another arrangement provided by the present invention.

FIG. 4 shows a further altered arrangement which may be provided by the present invention. This electrode cell 60 comprises a plurality of copper electrodes 10 and silver electrodes 11 arranged around a cylindrical non-emissive electrode 20 composed of titanium. This arrangement is particularly useful when large electrode cells are required.

Further, in large installations, the electrode cells may be arranged in series or in parallel.

The dimensions of the electrode is not significant and the important aspect to consider when manufacturing the electrodes in the amount of metal which is required to deplete over a long period of time, for example, two years. However, the dimensions of the electrodes are typically 1 inch square bars but may also be ½ inch thick, 2½ inch wide bars. The dimensions may vary and it will be appreciated that the dimensions are not limited to the aforementioned values.

All the above described embodiments are by way of example only and it will be appreciated that the arrangement utilised by the electrode cells will depend on the amount of water to be treated and the practicality in fitting different sized cells within pipework.

The electrode cell bodies are preferably constructed of three materials: polyvinyl chloride (PVC) mainly for cold water treatment; acrylonitrile-butadiene-styrene (ABS) for hot and cold water where water pressure is low; and high temperature coated aluminium for high static and dynamic pressure for both hot and cold water. All aluminium cell surfaces both internal and external are coated with a high temperature resilient epoxy, preferably in the form of a powder, approved for drinking water purposes. In addition, the cells are fitted with flange plates and easily removable pipe couplings, typically 2 inches in size, incorporating isolation valves. For easy installation and removal, the electrode cell connections are made by a plug and socket arrangement. The electrode cell body is not limited to the above-mentioned construction and it will be appreciated that any appropriate construction may be utilised for the cell body as long as the desired effect of reducing scale is achieved.

A further feature of the water purification apparatus, the DC power supply is provided with a mains voltage input of either the UK standard 200–240V AC/50 Hz or the US standard 90–120V AC/60 Hz and is capable of delivering a remotely switchable output preferably between 0–100V. The current is preferably rated at 3 Amps, 5 Amps, 10 Amps and 20 Amps depending on the specific requirements of the apparatus.

The apparatus can be controlled in a plurality of ways. A water flow meter can be inserted into a water system to monitor the water and adjust the current in proportion to the water flow. The current is controlled by the primary output level control which is provided on the front panel of the apparatus. The apparatus is further provided with a secondary bi-level output control that can be set and switched automatically by a time clock at the discretion of the user.

Further features which may form part of the apparatus include a service and maintenance indicator for electrode replacement, a storage tank level control input, a building management system (BMS) interface for remote monitoring of both voltage and current, a polarity indicator in the form of an LED or any other similar means, a voltage and current display, a remote alarm output, an input for proportional monitoring sensing, and a display for the time clock. These further features are merely described to explain the construction of the apparatus, and it should be apparent that the desired effect of reducing scale may be achieved even if all these features are not present.

What is claimed is:

1. A water purification apparatus comprising a plurality of electrodes connected to a DC power supply, one of the electrodes being made of titanium and each other electrode being copper or silver or a mixture of copper and silver, wherein a plurality of other electrodes are disposed around a cylindrical titanium electrode, DC power supply being provided with control means for cyclically alternating the polarity of the output of the power supply for predetermined intervals with quiescent periods therebetween.

2. Apparatus according to claim 1 wherein the control is arranged to vary the length of the predetermined interval.

3. Apparatus according to claim 1 wherein the cycle time is between 30 and 60 seconds.

4. Apparatus according to claims 1 wherein the control means is arranged to select the amplitude of the current from a number of predetermined current values.

5. Apparatus according to claim 1, wherein the other electrodes are alternately copper and silver.

6. A water purification apparatus comprising a plurality of electrodes connected to a DC power supply, one of the electrodes being made of titanium and the or each other electrode being copper or silver or a mixture of copper and silver, DC power supply being provided with control means for cyclically alternating the polarity of the output of the power supply for predetermined intervals with quiescent periods therebetween, wherein the control means is arranged to select the amplitude of the current from a number of predetermined current values.

* * * * *